United States Patent [19]

Lehmann

[11] Patent Number: 5,014,368
[45] Date of Patent: May 14, 1991

[54] METHOD FOR MONITORING THE DISCHARGE OF LIQUIDS AND APPARATUS THEREFOR

[75] Inventor: Wolfgang Lehmann, Stutensee, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 404,822

[22] Filed: Sep. 8, 1989

[30] Foreign Application Priority Data

Sep. 10, 1988 [DE] Fed. Rep. of Germany ....... 3830839

[51] Int. Cl.⁵ .................... E03D 1/00; G01N 21/01
[52] U.S. Cl. ............................... 4/314; 4/619; 4/DIG. 3; 250/432 R
[58] Field of Search ................. 4/302, 304, 305, 313, 4/314, 315, 619, DIG. 3; 250/364, 432 R, 435, 437; 128/760; 210/96.1, 739

[56] References Cited

U.S. PATENT DOCUMENTS

| | | | |
|---|---|---|---|
| 3,953,737 | 4/1976 | Neeb et al. | 250/432 R |
| 4,471,498 | 9/1984 | Robertshaw | 4/302 |
| 4,591,716 | 5/1986 | Kitaguchi et al. | 250/432 R X |
| 4,636,474 | 1/1987 | Ogura et al. | 4/314 X |
| 4,725,735 | 2/1988 | Ariel et al. | 250/386 |
| 4,962,550 | 10/1990 | Ikenaga et al. | 4/314 X |

FOREIGN PATENT DOCUMENTS 2851781 6/1980 Fed. Rep. of Germany .

Primary Examiner—Henry J. Recla
Assistant Examiner—Robert M. Fetsuga
Attorney, Agent, or Firm—Walter Ottesen

[57] ABSTRACT

The invention is directed to a method and apparatus for monitoring liquids discharged intermittently from a discharge receptacle having a siphon. The liquids originate in a facility in which personnel work with open radioactive substances. Measurements are made of the radioactive charge of discharged liquids in the region of the siphon of each discharge receptacle to prevent contamination of the discharge path into the drainage system. If a radioactive limit value of radiation is detected which is above a specific threshold, discharge of the liquid into the drainage network is prevented. The discharge receptacles are then emptied individually and upwardly.

10 Claims, 1 Drawing Sheet

METHOD FOR MONITORING THE DISCHARGE OF LIQUIDS AND APPARATUS THEREFOR

FIELD OF THE INVENTION

The invention relates to a method and apparatus for monitoring liquids intermittently discharged from plants in which personnel work with open radioactive substances and in particular for the removal of sanitary waste from nuclear facilities. These liquids are discharged via a discharge receptacle provided with a siphon.

BACKGROUND OF THE INVENTION

In nuclear facilities, particularly plants for reprocessing irradiated nuclear fuels, the discharge of non-radioactive liquids such as sanitary waste from the radioactive controlled areas must be monitored so that the appropriate action can be taken should these substances prove to carry an undesired radioactive charge. The non-radioactive liquids and sanitary waste originate in non-radioactive areas within the controlled area, for example, in sanitary blocks.

Since every effort is made to minimize radioactive waste from controlled areas, it is necessary that the non-radioactive liquids be safely passed into the drainage system as a non-radioactive substance. This applies especially to sanitary waste which constitutes a very large volume together with the flushing water used in expanded controlled areas.

In nuclear medicine, it is normal practice for the toilets in a toilet layout to be connected to a decay container. Mounted on this decay container is a detection device by means of which the decay of short-lived radioisotopes can be monitored. After decay to below a specific level of radioactivity, the water can be passed into the drainage system.

This solution to the problem is only suitable for nuclear medical departments of hospitals in which short-lived radioisotopes are used for therapeutic or diagnostic purposes.

Published German patent application 2,851,781 discloses a decay plant for radioactively charged fecal waste from toilet systems in which all the toilets are connected to a measuring container. The measuring container has a station at which the radioactivity is measured. The result of the measurement actuates shut-off means which control dispersal into two different decay containers.

This apparatus is used for toilet systems by means of which it is intended to effect a controlled discharge of radionuclides administered during therapy and diagnosis. In the case of radionuclides with a long half-life value such as may well be present in other nuclear facilities, the entire apparatus would be contaminated so that any newly introduced non-radioactive liquid would again be contaminated.

SUMMARY OF THE INVENTION

It is an object of the invention to provide a method of the kind described above which is improved to prevent the contamination of the discharge path.

The method of the invention is for monitoring a liquid such as sanitary waste discharged intermittently into a drainage system from a discharge receptacle having a siphon. The liquid is discharged from a facility such as a nuclear facility wherein work is performed with open radioactive materials. The method includes the steps of: measuring the level of radioactivity of the discharged liquid at the siphon; preventing a discharge of the liquid into the drainage system in response to a level of radioactivity above a predetermined radioactive radiation limit value; and, emptying the discharge receptacle from above.

In the method according to the invention any radioactive loading of the waste liquid in question is monitored directly at the discharge location at the siphon. By monitoring close to where the waste is discharged, entrainment of radioactivity into the drainage system and thus contamination can be prevented. An unintentional discharge of radionuclides into the drainage system is detected and prevented very early on. The radionuclides can be returned to the controlled zone by the upwardly directed emptying procedure and then treated as radioactively-charged waste. The non-radioactively laden liquids which represent a vast volume can be fed directly into the drainage system which leads to a considerable reduction in that waste from nuclear facilities which has to be treated separately.

In an advantageous further embodiment of the invention, the measurement cycle is automatically triggered when a person approaches the location of the discharge receptacle and is then automatically terminated when the person leaves the location of the discharge receptacle. The measurement for a radioactive charge of the discharged liquids will be triggered and evaluated irrespective of the person using the discharge receptacle.

According to another feature of the invention, the measurement cycle continues for a predetermined follow-on time duration after a detection is made that the use of the discharge receptacle by the person has ended. Because the measurement cycle continues to run after the detected termination of use of the discharge receptacle, it is possible to work with the detection limit which is required in a particular case. The lower the detection limit, the longer the follow-on time duration will be set.

In a further embodiment of the invention, the method is applied to a toilet. The flushing process is only then automatically triggered when no radioactive loading has been measured.

The invention also relates to an apparatus for carrying out the method and includes radiation measurement means for detecting radioactivity in the waste liquid. By mounting the detection means on the siphon of each discharge receptacle, it is possible to monitor the liquids in the siphon for alpha, beta and gamma radiating radionuclides. If a limit value is exceeded, the drainage of the liquid is prevented. The siphon is then emptied by drawing up the waste liquid manually with the aid of suction.

According to another embodiment of the apparatus, an electronic proximity switch is mounted at the location of the discharge receptacle so that use of the discharge receptacle by a person can be reliably monitored and the measurement cycle automatically started.

Pursuant to another feature of the invention, the discharge receptacle in the form of a toilet can be provided with a flushing device which can be blocked by blocking means electrically actuable by the evaluation circuit means. Also, a closure device can be placed in the drainage conduit downstream of the siphon which is actuable via the evaluation circuit means. In this way, the drainage of the liquid waste can be blocked if a radioactive charge is detected. The flushing device and the closure device can also be used in conjunction with each other.

A further advantageous embodiment relates to a toilet compartment which can be adequately monitored by the combination of electrical door contacts and a proximity switch. The electrical signals obtained are passed to the electronic control unit for evaluation.

A further embodiment ensures that the quantity of liquid or feces discharged cannot cause the displacement of the water present in the siphon to overflow or to be discharged prematurely into the drainage system.

With the invention, the radionuclide-charged liquids remain at the discharge receptacle. Contamination by a radioactively loaded discharge can only occur up to the siphon area which is especially important in the case of radionuclides of a long half-life value and a substantial specific radioactivity. The discharge receptacle can be rapidly drained under full control. The liquids recovered can be subjected to laboratory examination in order to ascertain the place of origin.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
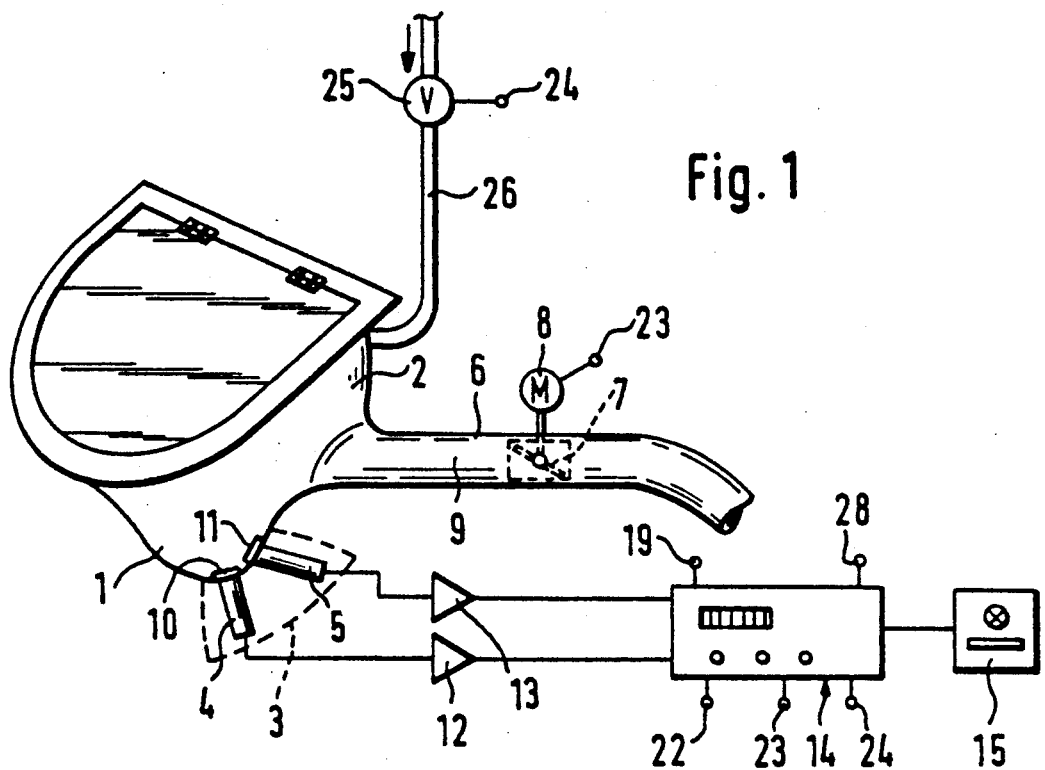
FIG. 1 shows a toilet monitored by an electronic evaluating apparatus according to a preferred embodiment of the invention; and, FIG. 2 is a schematic plan view of the toilet cubicle showing the arrangement of the signal contacts.

A radiation measuring device 3 is mounted on the siphon 1 of a toilet 2 and includes a detector 4 for alpha measurement and a detector 5 for beta and gamma measurements. A drainage pipe 6 leading to the drainage system is disposed behind the siphon 1. A shutoff valve 7 is built into the drainage pipe 6 and can be actuated by an electric motor 8.

An adequately large trap 9 is provided in the drainage pipe 6 between the siphon 1 and the shutoff valve 7. The trap 9 receives the liquid displaced from the siphon 1 when further liquids or feces are added.

Detection windows 10 and 11 are provided on the siphon 1 which effect only minimal absorption of the radioactive radiation.

The counting pulses of the detectors 4 and 5 are passed via amplifiers 12 and 13 to an electronic evaluating unit 14 incorporating an integrated control apparatus which transmits an output signal to an alarm unit 15 if a limit value is exceeded.

The toilet cubicle 16 has a door 17 which, in the closed state, actuates an electrical door contact 18 which is electrically connected to the electronic evaluating unit 14 via a lead 19. Provided on the frame of the door 17 is a locking unit 21 which, via a line 22, can receive an output signal to lock or unlock the door 17.

The electronic evaluating unit 14 is connected to the motor 8 of the shutoff valve 7 via a signal output line 23. Another signal output line 24 acts on a magnetic shutoff valve 25 in a flushing pipe 26 of the toilet 2.

Figure 2:
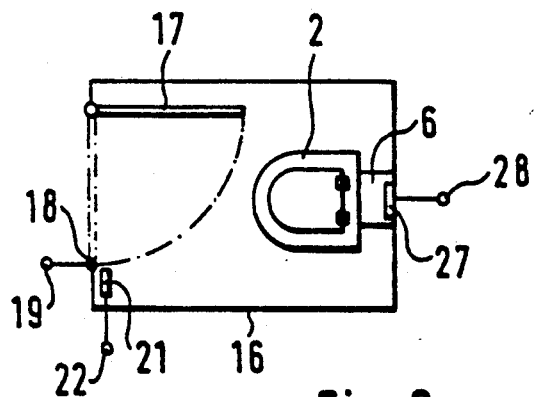

An electronic proximity switch 27 (FIG. 2) is provided in the region of the toilet 2. The switch 27 is connected to the electronic evaluating unit 14 via a signal line 28.

The operation of the apparatus described above is explained below.

The entry of a person into the toilet cubicle 16 is detected by the electronic evaluating unit 17 via the door contact 18 when toilet door 17 is opened. The proximity switch 27 detects the person. From the time sequence of the door contact signal and the signal from the proximity switch 27, the electronic evaluating unit 14 detects the fact that the toilet cubicle has been entered and triggers the measuring cycle for alpha and beta/gamma measurement at the electronic evaluating unit 14.

When the person leaves the toilet cubicle 16, the electronic evaluating unit 14 recognizes this fact via the signals delivered by the proximity switch 27 and the door contact 18 and, via the locking unit 21, locks the door 17 so that further use of the toilet 2 is prevented until the measuring cycle has been concluded. The measuring cycle is adjustable and is adapted to the necessary detection limit.

If no limit value of radiation has been exceeded, the electronic evaluating unit 14 issues a clear signal to the integrated control unit. A control signal switches on the electric motor 8 which then opens the shutoff valve 7. Thereafter, the electronic evaluating unit 14 issues a further actuating signal via the output line 24 to the magnetic valve 25 which then opens and the flushing operation starts. When the automatic flushing operation has been completed, the electronic evaluating unit 14 closes the shutoff valve 7, the flushing valve 25 and releases the door lock.

If any limit value has been exceeded, access to the toilet compartment 16 is blocked and it can only be opened by authorized personnel alarmed by the alarm unit 15. The toilet 2 can be emptied in the upward direction by a mobile extraction apparatus. The toilet 2 is then decontaminated.

It is understood that the foregoing description is that of the preferred embodiments of the invention and that various changes and modifications may be made thereto without departing from the spirit and scope of the invention as defined in the appended claims.

What is claimed is:

1. A method of monitoring a liquid such as sanitary waste discharged intermittently into a drainage system from a discharge receptacle having a siphon interposed between the receptacle and the drainage system, the liquid being discharged from a facility such as a nuclear facility wherein work is performed with open radioactive materials, the method comprising the steps of:
providing radiation detection means at the siphon;
measuring the level of radioactivity of the liquid at the siphon;
preventing a discharge of the liquid into the drainage system in response to a level of radioactivity above a predetermined radioactive radiation limit value; and,
emptying the discharge receptacle from above.

2. The method of claim 1, wherein the discharge receptacle is located in a predetermined region into and out of which a person using the discharge receptacle passes, and the step of measuring the level of radioactivity including a measurement cycle, the method comprising the further steps of:
automatically initiating the measurement cycle when the person enters the region; and,
automatically terminating the measurement cycle when the person leaves the region.

3. The method of claim 1, wherein the discharge receptacle is located in a predetermined region into and out of which a person using the discharge receptacle passes, and the step of measuring the level of radioactivity including a measurement cycle, the method comprising the further steps of:

detecting when the person enters the region and then automatically initiating the measurement cycle;

detecting when the person ends the use of the discharge receptacle and causing the measurement cycle to continue for a predetermined follow-on time duration; and, initiating a discharge operation causing the liquid to be discharged into the drainage system in response to a negative detection of radioactivity in the liquid.

4. The method of claim 1, wherein the discharge receptacle is a toilet bowl connected to the drainage system via a drainage conduit which is openable and closable, the toilet bowl being located in a toilet room into and out of which a person using the toilet bowl passes, and the step of measuring the level of radioactivity including a measurement cycle, the method comprising the further steps of:

maintaining the drainage conduit closed;

detecting when the person enters the toilet room and then automatically initiating the measurement cycle;

detecting when the person ends the use of the toilet room and causing the measurement cycle to continue for a predetermined follow-on time duration thereafter; and, automatically flushing the toilet and automatically opening the drainage conduit in response to a negative detection with respect to the level of radioactivity in the liquid in the toilet bowl.

5. Apparatus for monitoring a liquid such as sanitary waste discharged intermittently into a drainage system from a discharge receptacle having a siphon interposed between the receptacle and the drainage system, the liquid being discharged from a facility wherein work is performed with open radioactive materials, the apparatus comprising:

radiation detection means adapted to be mounted at the siphon for measuring the level of radioactivity of the liquid;

evaluation circuit means connected to said radiation detection means for determining if said level of radioactivity exceeds a predetermined radiation limit level; and, said evaluation circuit means including control means for preventing the discharged liquid from being passed into the drainage system when said radiation limit level is exceeded.

6. The apparatus of claim 5, comprising a proximity switch for detecting the presence of a person at the discharge receptacle and to initiate a measurement cycle in said evaluation circuit means.

7. The apparatus of claim 5, wherein said discharge receptacle is a toilet bowl having a flushing arrangement for flushing the toilet bowl, said apparatus further comprising blocking means electrically actuable by said evaluation circuit means for blocking the flushing arrangement from flushing the toilet bowl.

8. The apparatus of claim 7, wherein the siphon is connected to the drainage system via a drainage conduit, said apparatus further comprising a closure device mounted in said drainage conduit downstream of the siphon for closing the drainage conduit in response to a control signal from said evaluation circuit means.

9. The apparatus of claim 7, wherein the toilet bowl is disposed in a toilet room having a door for allowing a person to enter and leave the toilet room, the apparatus further comprising: closure contacts mounted on the door and a proximity switch arranged near the toilet bowl, said contacts and said switch being connected to said evaluation circuit means for providing signals to the latter for initiating and terminating a measurement cycle within said evaluation circuit means.

10. The apparatus of claim 5, wherein the siphon is connected to the drainage system via a drainage conduit, said apparatus further comprising a closure device mounted in said drainage conduit downstream of the siphon for closing the drainage conduit in response to a control signal from said evaluation circuit means; and, trap volume means arranged int eh drainage conduit and disposed between the siphon and the closure device.

* * * * *